(12) United States Patent
Khasin (10) Patent No.: US 8,962,197 B2
(45) Date of Patent: Feb. 24, 2015

(54) ELECTROLYTE SYSTEM FOR METAL-AIR BATTERIES AND METHODS OF USE THEREOF

(75) Inventor: Ernst Khasin, Rehovot (IL)

(73) Assignee: Phinergy, Ltd., Lod (IL)

( * ) Notice: Subject to any disclaimer, the term of this patent is extended or adjusted under 35 U.S.C. 154(b) by 51 days.

(21) Appl. No.: 13/563,743

(22) Filed: Aug. 1, 2012

(65) Prior Publication Data
US 2013/0034781 A1 Feb. 7, 2013

Related U.S. Application Data

(60) Provisional application No. 61/514,201, filed on Aug. 2, 2011.

(51) Int. Cl.
*H01M 8/22* (2006.01)
(52) U.S. Cl.
USPC .......................................... 429/403; 429/402
(58) Field of Classification Search
None
See application file for complete search history.

(56) References Cited

U.S. PATENT DOCUMENTS

| 4,663,249 A | 5/1987 | Gordon |
| 4,994,332 A | 2/1991 | Coin et al. |
| 5,260,144 A | 11/1993 | O'Callaghan |
| 2002/0009649 A1* | 1/2002 | Sato et al. ...................... 429/306 |
| 2007/0154814 A1* | 7/2007 | Ryu et al. ...................... 429/321 |

OTHER PUBLICATIONS

Linden et al. Single p. 38.43 (i.e. p. 43 within chapter 38)—Handbook of Batteries third edition.

* cited by examiner

*Primary Examiner* — Cynthia K. Walls
(74) *Attorney, Agent, or Firm* — Pearl Cohen Zedek Latzer Baratz LLP; Zeev Pearl (57) ABSTRACT

This invention is directed to electrolyte systems for metal-air electrochemical power sources, particularly Al-Air batteries and fuel cells with alkaline electrolyte, methods of increasing the ionic conductivity of such electrolytes, methods of increasing the electrolyte utilization coefficient and to methods of use thereof.

28 Claims, 3 Drawing Sheets

ELECTROLYTE SYSTEM FOR METAL-AIR BATTERIES AND METHODS OF USE THEREOF

CROSS REFERENCE TO RELATED APPLICATIONS

This application claims priority from U.S. Ser. No. 61/514,201, filed Aug. 2, 2011, which is hereby incorporated by reference in its entirety.

FIELD OF THE INVENTION

This invention is directed to electrolyte system for metal-air electrochemical power sources, particularly Al-air batteries and fuel cells with alkaline electrolyte, methods of increasing the electrolyte utilization coefficient and to methods of reducing metal-hydroxide precipitate/gel formed in circulated alkaline hydroxide electrolyte.

BACKGROUND OF THE INVENTION

Metal-air electrochemical power sources, particularly Al-air batteries and fuel cells with alkaline electrolyte are suitable for electric vehicles, unmanned aerial vehicles (UAV), reserve and emergency power supply and other applications.

The electrochemical reaction in Al-air system yields products which are transferred through the electrolyte. Aluminum—air system with alkaline electrolyte has a great electrochemical capacity (about 8 k Wh/kg). As a result, this system requires large amount of the electrolyte compared to other metal-air systems. The use of the large amount of the electrolyte in the reaction is achieved by its circulation through the electrochemical cell. However such Al-Air systems have few disadvantages. One of them is formation of aluminum hydroxide gel in the electrolyte as a product of current generation during electrochemical reaction. This process increases the electrolyte density and decreases its ionic conductivity which results in a low electrolyte utilization coefficient (about 0.3 Ah/ml) and correspondingly to low energy density value.

One of the ways to overcome this problem is by filtration or separation of the formed aluminum hydroxide gel from the "pure" electrolyte [D. Linden, T. B. Reddy, Handbook of Batteries, third edition, p.p. 38.43 and U.S. Pat. No. 4,994,332]. Another way to overcome the formation of aluminum hydroxide gel is by adding to a circulating alkaline electrolyte after few hours of discharge (when electrolyte is coming to saturation by aluminum hydroxide) a seed material such as aluminum oxide or aluminum salts, which could be a driving force for the precipitation out of the already formed $Al(OH)_3$ [U.S. Pat. No. 5,260,144]. The seed material is added to the electrolyte by a time responsive automatic seed injector after certain battery discharge time. U.S. Pat. No. 4,663,249 suggests to control the aluminum hydroxide gel concentration by contacting the electrolyte with acids or salts what finally results in formation of insoluble electrolyte compounds, which could be later separated or isolated from the electrolyte.

The above techniques trying to reduce the amount of aluminum hydroxide gel do not solve electrolyte deterioration problems and noticeably increase the need for methods to avoid, reduce or remove aluminum hydroxide precipitate from the alkaline electrolyte.

SUMMARY OF THE INVENTION

In one embodiment, this invention provides a method of avoiding the formation of or of removing or of reducing the concentration of metal-hydroxide precipitate formed in an alkaline electrolyte solution of a metal-air electrochemical cell during an electrochemical reaction, said method comprising adding submicron particles to said solution or applying ultrasonic vibration to said solution or a combination thereof.

In one embodiment, this invention provides a method of increasing the electrolyte utilization coefficient of an alkaline electrolyte in a metal-air electrochemical cell, comprising adding submicron particles to said electrolyte or applying ultrasonic vibration to said electrolyte or a combination thereof.

In one embodiment, this invention provides a metal-air cell comprising:
  an electrolyte chamber comprising alkaline electrolyte;
  an inlet for introducing said electrolyte into said electrolyte chamber;
  an outlet for removing said electrolyte from said electrolyte chamber; and
  optionally an ultrasonic source;
  wherein submicron particles are added to said electrolyte prior to cell discharge and/or during cell discharge through said inlet.

In one embodiment, the electrolyte is circulating.

In one embodiment, this invention provides a composition for use in a metal-air electrochemical cell, said composition comprises:
  an alkaline aqueous solution; and
  submicron particles;
  wherein said composition is used as the alkaline electrolyte solution in said cell.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 1 is a schematic cross-sectional view [1A] and top view [1B] of an electrochemical metal-air cell according to the present invention comprising an electrochemical cell case [1]; an Al anode [2], two air cathodes [4], a circulating electrolyte chamber [3] wherein the circulation of electrolyte into the cell was carried out through two inlets [5] and two outlets [6] for the circulated electrolyte. The open area of cell case [1] adjacent to air electrode [4] stands duty as a source for air/oxygen.

DETAILED DESCRIPTION OF THE INVENTION

In one embodiment, this invention is directed to an electrolyte system for metal-air electrochemical power sources, methods of increasing the electrolyte utilization coefficient of such electrolytes and to methods of reducing metal-hydroxide precipitate/gel formed in circulated alkaline hydroxide electrolyte.

In one embodiment, the metal-air power source is an Al-air cell wherein the overall process of current generation for Al-Air system with alkaline electrolyte is presented as follows:

$$4Al+3O_2+6H_2O \rightarrow 4Al(OH)_3 \quad (1)$$

$Al(OH)_3$ in molecular or colloidal form dissolves in the excess of alkaline electrolyte according to the following reaction:

$$Al(OH)_3 + KOH \leftrightarrow K[Al(OH)_4] \quad (2)$$

The liquid potassium aluminate (tetra hydroxyl potassium aluminate)—has similar ionic conductivity as KOH water solution with similar concentration.

The reaction zone of a metal-air battery anode is on the anode surface in a gap between the cathode and the anode.

Due to shortage of hydroxyl ions in the reaction zone of the Al-air battery, liquid potassium aluminate does not form and only aluminum hydroxide gel or precipitate [$Al(OH)_3$] is formed in a colloidal form as presented in reaction 1. The so called "aluminum hydroxide gel" or "aluminum hydroxide precipitate" is an indefinite and large molecule consisting in particular of hydrated aluminum ions, water molecules and hydroxides ions. Geometrical size of the gel's particles could reach few millimeters. With increasing of aluminum hydroxide concentration the density of the electrolyte increases and the ionic conductivity decreases what finally results in a battery's performance decay.

Thus, this invention provides a method of avoiding the formation of or of removing or of reducing the concentration of $Al(OH)_3$ gel (or precipitate) the method comprising adding submicron or nano-sized particles to a circulating electrolyte or applying ultrasonic vibration to a circulating electrolyte, or combination thereof wherein the submicron or nano-sized particles (with or without ultrasonic vibration) break (comminute or chop) the product of the electrochemical reaction—the $Al(OH)_3$ gel—down to submicron size.

In one embodiment, the submicron particles break the $Al(OH)_3$ gel while it forms. In one embodiment, the submicron particles break the $Al(OH)_3$ gel before it reaches a large size. In one embodiment, the submicron particles break the $Al(OH)_3$ gel before it precipitates.

In one embodiment, this invention provides a method of avoiding the formation of or of removing or of reducing the concentration of $Al(OH)_3$ gel (or precipitate) or a combination thereof, the method comprising adding submicron or nano-sized particles to a circulating electrolyte or applying ultrasonic vibration to a circulating electrolyte, or combination thereof.

In one embodiment, the kinetic energy of the moving submicron or nano-sized inert particles or the energy of the ultrasonic oscillation or both of these factors together enable to comminute large coagulated aluminum hydroxide gel particles down to a micron size or to a submicron size. In this case those submicron aluminum hydroxide particles can bear some electric charge (peptization phenomena) and repel each other, avoiding (at least for some time) a flocculation process and adding to the ionic conductivity (Kurmar, et al. U.S. Pat. No. 6,986,970), thereby, notably increasing electrolyte utilization coefficient.

In one embodiment, the ultrasonic vibration provides kinetic energy to the $Al(OH)_3$ gel to react with the hydroxyl ions of the electrolyte according to reaction (2) forming potassium (or sodium) aluminate, which has conductivity that is comparable to alkaline-hydroxide of electrolyte.

In one embodiment, the kinetic energy of the moving submicron or nano-sized inert particles or the energy of the ultrasonic oscillation or both of these factors together enable to avoid, prevent or reduce the formation of metal hydroxide gels, metal hydroxide precipitates, metal hydroxide large molecules or a combination thereof in the electrolyte during discharge.

Thus, in one embodiment, this invention provides a method of avoiding, of removing and/or of reducing the concentration of metal-hydroxide precipitate/gel from alkaline-hydroxide electrolyte formed in a metal-air electrochemical cell during an electrochemical reaction, comprising adding submicron or nano-sized particles to said electrolyte or applying ultrasonic vibration during said reaction or a combination thereof. In another embodiment this invention reduces the deterioration of electrolyte ionic conductivity and is directed to increase of the electrolyte utilization coefficient. In another embodiment, the electrolyte utilization coefficient is increased up to 0.6-0.7 Ah/ml. In another embodiment, the electrolyte utilization is increased to a range between 0.35 to 0.7 Ah/ml. In another embodiment, the electrolyte utilization is increased to a range between 0.35 to 0.55 Ah/ml. Theoretically the max utilization coefficient is about 0.8 Ah/ml.

In one embodiment, this invention provides a method of removing and/or of reducing the concentration of metal-hydroxide precipitate formed in an alkaline electrolyte solution of a metal-air electrochemical cell during an electrochemical reaction, the method comprising adding submicron particles to the solution or applying ultrasonic vibration to the solution or a combination thereof.

In one embodiment, this invention provides a method of avoiding the formation of, or of reducing the concentration of metal-hydroxide precipitate formed in an alkaline electrolyte solution of a metal-air electrochemical cell during an electrochemical reaction, the method comprising adding submicron particles to the solution or applying ultrasonic vibration to the solution or a combination thereof.

In one embodiment, this invention provides a method of avoiding the formation of, and/or of reducing the concentration and/or of removing of metal-hydroxide precipitate formed in an alkaline electrolyte solution of a metal-air electrochemical cell during an electrochemical reaction, the method comprising adding submicron particles to the solution or applying ultrasonic vibration to the solution or a combination thereof.

In one embodiment, this invention provides a method of avoiding the formation of, or of reducing the concentration of and/or of removing metal-hydroxide precipitate formed in an alkaline electrolyte solution of a metal-air electrochemical cell during an electrochemical reaction, the method comprising adding submicron particles to the solution or applying ultrasonic vibration to the solution or a combination thereof.

In one embodiment, this invention provides a method of avoiding the formation of or of removing or of reducing the concentration of metal-hydroxide precipitate formed in an alkaline electrolyte solution of a metal-air electrochemical cell during an electrochemical reaction, said method comprising adding submicron particles to said solution or applying ultrasonic vibration to said solution or a combination thereof.

In one embodiment, the submicron or nano-sized particles are added to the electrolyte prior to discharge. In one embodiment, the submicron or nano-sized particles are not seed particles. In one embodiment, the submicron or nano-sized particles are not seed particles for precipitation of species formed during discharge. In one embodiment, the submicron or nano-sized particles do not function as seed particles for the precipitation of species formed during discharge. In one embodiment, the submicron or nano-sized particles comprise Al. In another embodiment, the submicron or nano-sized particles do not comprise Al. In one embodiment, the submicron particles avoid, prevent or reduce the formation of metal hydroxides in the electrolyte during discharge.

In one embodiment, this invention provides a method of increasing the electrolyte utilization coefficient of an alkaline-hydroxide electrolyte in a metal-air electrochemical cell, comprising adding submicron or nano-sized particles to said electrolyte or applying ultrasonic vibration or a combination thereof.

In one embodiment, the submicron or nano-sized particles are added to the electrolyte prior to discharge. In one embodiment, the submicron or nano-sized particles are added to the electrolyte at the beginning of the discharge process. In one embodiment, the submicron or nano-sized particles are added to the electrolyte before 50% of discharge process time is completed. In one embodiment, the submicron or nano-sized particles are not seed particles. In one embodiment, the submicron or nano-sized particles are not seed particles for precipitation of species formed during discharge. In one embodiment, the submicron or nano-sized particles do not function as seed particles for the precipitation of species formed during discharge. In one embodiment, the submicron or nano-sized particles comprise Al. In another embodiment, the submicron or nano-sized particles do not comprise Al. In one embodiment, the submicron particles avoid, prevent or reduce the formation of metal hydroxides in the electrolyte during discharge. In one embodiment, the submicron particles avoid, prevent or reduce the formation of metal hydroxide precipitate in the electrolyte during discharge. In one embodiment, the submicron particles avoid, prevent or reduce the formation of metal hydroxide gel in the electrolyte during discharge. In one embodiment, the submicron particles reduce the concentration of metal hydroxide large molecules, metal hydroxide gels, metal hydroxide precipitate or a combination thereof.

In one embodiment, the methods of this invention comprise addition of submicron or nano-sized inert particles to the electrolyte solution. In another embodiment, the methods of this invention comprise applying an ultrasonic vibration to the electrolyte solution. In another embodiment, the methods of this invention comprise addition of submicron or nano-sized inert particles to the electrolyte solution together with applying ultrasonic vibration to the electrolyte solution.

In one embodiment, methods of this invention comprise removing metal-hydroxide precipitate/gel from alkaline-hydroxide electrolyte formed in a metal-air electrochemical cell during an electrochemical reaction and increasing of the electrolyte utilization coefficient. In one embodiment, methods of this invention comprise reducing the concentration of metal-hydroxide precipitate/gel from alkaline-hydroxide electrolyte formed in a metal-air electrochemical cell during an electrochemical reaction and increasing of the electrolyte utilization coefficient. In one embodiment, methods of this invention comprise avoiding the formation of metal-hydroxide precipitate/gel from alkaline-hydroxide electrolyte formed in a metal-air electrochemical cell during an electrochemical reaction and increasing of the electrolyte utilization coefficient.

In one embodiment, the metal-hydroxide precipitate/gel is $Al(OH)_3$. In another embodiment, the metal-hydroxide precipitate/gel is $Zn(OH)_2$. In another embodiment, the metal-hydroxide precipitate/gel is $Mg(OH)_2$. In another embodiment, this invention is directed to a method of increasing the electrolyte utilization coefficient wherein the method further reduces the formation of $Al(OH)_3$ precipitate/gel. In one embodiment, methods of this invention are reflected in uses of metal-air cells of this invention.

In one embodiment, the metal-air electrochemical cell of this invention is an aluminum-air cell (i.e. Al-air cell). In another embodiment, the metal-air cell is a zinc-air cell (i.e. Zn-air cell). In another embodiment, the metal-air cell is a magnesium-air cell (i.e. Mg-air cell).

In one embodiment, the methods of this invention and the metal-air electrochemical cell of this invention make use or comprise an alkaline hydroxide electrolyte. In one embodiment, the alkaline hydroxide electrolyte is or comprises sodium hydroxide. In another embodiment, the alkaline hydroxide electrolyte is or comprises potassium hydroxide. In another embodiment, the concentration of the alkaline-hydroxide in the electrolyte is between 1-40% wt. In another embodiment, the concentration of the alkaline-hydroxide in the electrolyte is between 20-30% wt. In another embodiment, the concentration of the alkaline-hydroxide in the electrolyte is about 25% wt.

In one embodiment, the alkaline hydroxide electrolyte refers to an aqueous solution comprising hydroxide (e.g. NaOH or KOH) and water. In one embodiment the wt % of the hydroxide is from the total weight of the electrolyte solution. In one embodiment, alkaline hydroxide is used to describe a substance that in aqueous environment (e.g. in water) releases OH" ions. In one embodiment, an alkaline hydroxide generates alkaline or basic solution. In one embodiment, an alkaline solution is a solution of pH higher than 7.0. In one embodiment, an "alkaline hydroxide" is synonymous with "hydroxide" in embodiments of the present invention. In one embodiment, "an electrolyte" is a substance that forms ions in solution and that elevates the conductivity of the solution. In some embodiments, "electrolyte" refers to the conductive solution used in electrochemical cells. In some embodiments, "electrolyte" refers to the aqueous solution comprising the hydroxide (e.g. an aqueous solution comprising NaOH or KOH). In one embodiment, "electrolyte" is one of the two phases contributing to an interface of interest. In the electrolyte phase charge is carried by the movement of ions. Electrolytes may be liquid solutions, or fused salts or ionically conducting solids. The electrolyte forms an interface with an electrode or with another electrolyte. In some embodiments, the cathode and the anode are in contact with the electrolyte.

In one embodiment, the methods of this invention and the metal-air electrochemical cell of this invention make use or comprise of submicron or nano-sized particles. In one embodiment, the submicron particles or nano-sized particles are oxides. In one embodiment, the submicron particles or nano-sized particles comprise $Al_2O_3$, $TiO_2$, $ZrO_2$ particles, or a combination thereof. Other particles include carbides or nitrides, including but not limited to WC. In one embodiment, the submicron particles comprise $HfB_2$. In one embodiment, the submicron or nano-sized particles are $Al_2O_3$ particles. In one embodiment, the submicron particles or nano-sized particles are $TiO_2$ particles. In one embodiment, the submicron particles or nano-sized particles are $ZrO_2$ particles. In another embodiment, the average diameter of the submicron particles or the nano-sized particles is between 5 nm to 1000 nm. In another embodiment, the average diameter of the submicron particles or nano-sized particles is between 10 nm to 500 nm. In another embodiment, the average diameter of the submicron particles or nano-sized particles is between 20 nm to 100 nm. In another embodiment, the average diameter of the submicron particles or nano-sized particles is between 20 nm embodiment, the average diameter of the submicron to nm. In another em particles or nano-sized particles is between 1 nm to 10 nm. In another embodiment, the average diameter of the submicron particles or nano-sized particles is between 10 nm to 100 nm. In another embodiment, the average diameter of the submicron particles or nano-sized particles is between 1 nm to 100 nm. In another embodiment, the average diameter of the submicron particles or nano-sized particles is between 1 nm to 250 nm. In one embodiment, in the case where the particles are not spherical, the dimensions cited above for a diameter refers to the largest dimension that may be measured between two points on the particle.

In one embodiment, for particle size distribution, the median values are defined as the value where half of the population resides above this point, and half resides below this point. For particle size distributions the median is called the D50. In one embodiment, the D50 for particles of the invention is ranging between 5 nm to 1000 nm or between 10 nm to 500 nm or between 20 nm to 100 nm or between 20 nm to 30 nm or between 1 nm to 10 nm or between 10 nm to 100 nm or between 1 nm to 100 nm or between 1 nm to 250 nm.

In one embodiment, in the case where the particles are not spherical, the dimensions cited above for a diameter refers to the largest dimension that may be measured between two points on the particle.

In one embodiment, the submicron or nano-sized particles of this invention are added to the electrolyte of this invention in an amount of between 0.1-1.5 wt % from the total amount of the electrolyte (the solution) used. In another embodiment, the submicron or nano-sized particles of this invention are added to the electrolyte of this invention in an amount of between 0.4-0.6 wt % from the total amount of the electrolyte used. In another embodiment, the submicron particles or nano-sized particles are added to the electrolyte of this invention in an amount of about 0.4 wt % from the total amount of the electrolyte used. In another embodiment, the submicron particles or nano-sized particles are added to the electrolyte of this invention in an amount ranging between 0.01 wt % and 3.0 wt % from the total amount of the electrolyte used. In one embodiment wt % means percent weight. In another embodiment, the submicron particles or nano-sized particles are added to the electrolyte of this invention in an amount ranging between 0.1 wt % and 0.9 wt % from the total amount of the electrolyte used. In one embodiment wt % means percent weight.

In one embodiment the submicron or nano-sized particles are added into the electrolyte of the invention prior to battery discharge or during the discharge. In another embodiment, the particles are added during the battery discharge. In another embodiment, the particles are added to the electrolyte prior to the battery discharge. In another embodiment, the particles are added to the electrolyte mixture prior to the discharge, followed by an intensive stirring which results in the formation of a stable suspension. This suspension is poured into an electrolyte tank of a battery or a fuel cell of the invention just before the electrolyte circulation and the battery discharge are being started. In one embodiment, "battery" refers to an electrochemical cell or cells as known to any person of ordinary skill in the art. In one embodiment, battery discharge refers to an electrochemical reaction and to the process that occurs in the battery when connected to a load.

In a method suggested in the art, a seed material, such as gibbsite or alumina is added to the electrolyte after several hours of discharge when the electrolyte is reaching saturation and when the electrolyte already comprises substantial amount of $Al(OH)_3$. Such methods involve the addition of seed material following discharge. The seed material is used to form a precipitate of e.g. aluminum hydroxide. Thus, the battery performance, at least theoretically, is improved by precipitation of aluminum hydroxide. The seed material comprises aluminum oxide or aluminum salts in order to induce precipitation of aluminum hydroxide.

In contrast and in one embodiment, in methods of the present invention, nanoparticles that are not seed particles are being used in order to prevent or avoid agglomeration of metal hydroxide particles. The nanoparticles of the invention are added to the electrolyte prior to discharge in one embodiment. The presence of the nanoparticles of the invention in the electrolyte prior to discharge, prevents the formation of large species/agglomerates of metal hydroxide (e.g. of $Al(OH)_3$). In one embodiment, in contrast to precipitation of an already formed $Al(OH)_3$ using seeds, methods of this invention prevents, eliminates, avoid or reduces the formation of $Al(OH)_3$ in advance.

In one embodiment, because in the present invention the nanoparticles are not seed particles, the nanoparticles are not restricted to particles that induce nucleation and/or precipitation.

Accordingly, nanoparticles of the invention may comprise any material including but not limited to metal oxides, salts, inert metal/metal alloy particles, inert organic particles such as polymeric particles, ceramic particles, and non-metallic particles including silica. In one embodiment, any type of particle that will not interfere with the electrochemical reaction may be used in methods and cells of the invention. In one embodiment, the kinetic energy of the moving submicron or nano-sized inert particles enable to comminute large coagulated aluminum hydroxide gel particles while they form down to a micron size or to a submicron size. In one embodiment, the kinetic energy of the moving submicron or nano-sized inert particles enables to reduce the formation of aluminum hydroxide particles. In one embodiment, the kinetic energy of the moving submicron or nano-sized inert particles enable to prevent the formation of metal hydroxides such as aluminum hydroxide particles or to prevent or avoid the formation of other metal hydroxide/aluminum hydroxide species (e.g. gels, agglomerates, porous structures, fibers etc.).

In one embodiment, in methods of the invention, there is no need for filtration or separation of the aluminum hydroxide precipitate as methods of the invention avoid, remove, and/or reduce the formation of such precipitate.

In one embodiment, the electrolyte is circulating. In one embodiment, circulation of the electrolyte is carried out during discharge operation in a continuous or in a pulsed manner. In one embodiment, an extra electrolyte tank at least partially filled with the electrolyte is connected to the electrolyte chamber of the electrochemical cell by at least two tubes/hoses. During battery discharge, a pump is used to circulate the electrolyte between the tank and the electrolyte chamber. The at least one inlet and at least one outlet of the electrolyte chamber are connected to the electrolyte tank to enable circulation in one embodiment.

In one embodiment, methods of this invention and the metal-air electrochemical cell of this invention make use or comprise an electrolyte which is subjected to circulation. In one embodiment, methods of this invention and the metal-air electrochemical cell of this invention make use or comprise an electrolyte which is subjected to an induced circulation.

In one embodiment this invention is directed to a metal-air electrochemical cell comprising:

an electrolyte chamber comprising alkaline electrolyte;
an inlet for introducing said electrolyte into said electrolyte chamber;
an outlet for removing said electrolyte from said electrolyte chamber; and
optionally an ultrasonic source;
wherein submicron particles are added to said electrolyte prior to cell discharge and/or during cell discharge through said inlet.

Figure 1A:
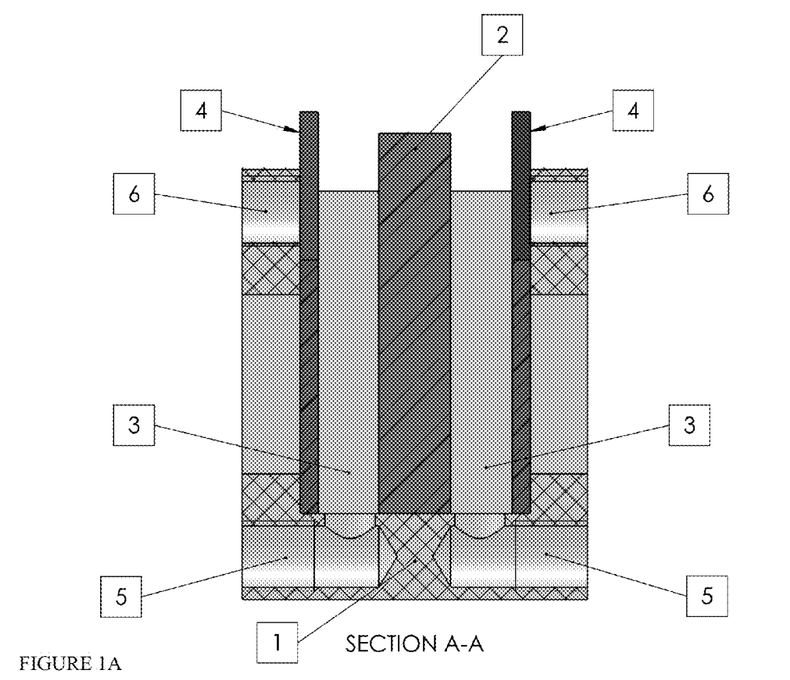
Figure 1B:
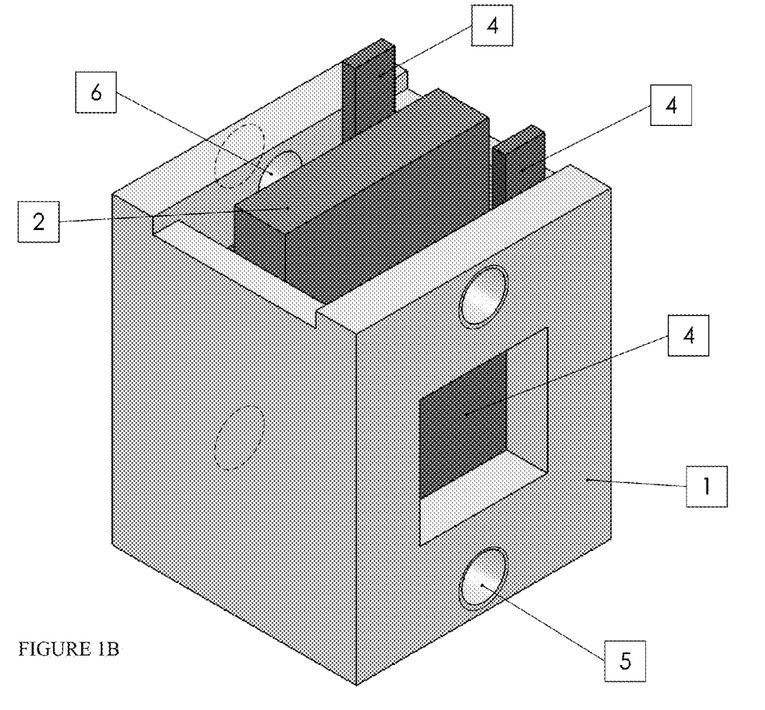

In one embodiment, the metal-air cell comprises one inlet and one outlet. In one embodiment, the metal air cell comprises two inlets and two outlets (inlets 5 and outlets 6 respectively as depicted in FIG. 1). In one embodiment, the number of inlets and outlets is adjusted to the number of cathodes used. In one embodiment, any number of inlets and any number of outlets for electrolyte circulation and/or for gas introduction can be used in methods and cell of the invention. In one embodiment, in case where there is more than one inlet and/or more than one outlet, each inlet/outlet may work independently of the other inlets/outlets. In another embodiment, the operation of the various inlets/outlets is correlated or synchronized.

In one embodiment, the inlets are used to introduce electrolyte solution to the cell. In one embodiment, the inlets are used to introduce the nanoparticles or the submicron particles to the cell. In one embodiment, the inlets are used to introduce an electrolyte solution comprising nanoparticles to the cell. In one embodiment, the electrolyte solution comprising the nanoparticles is in the form of a mixture or of a suspension, and this mixture/suspension is introduced to the cell through the one or more inlets. In one embodiment, the nanoparticles are introduced to the cell prior to cell operation (i.e. prior to discharge). In one embodiment, the nanoparticles are added to the electrolyte in the cell during cell discharge. In one embodiment, the nanoparticles are added prior to and during cell operation. In one embodiment, the nanoparticles are added to the electrolyte manually. In one embodiment, the nanoparticles are added to the electrolyte in an automated manner.

In one embodiment, the metal-air electrochemical cell of this invention refers to a metal-air cell. In one embodiment, the metal-air electrochemical cell of this invention is presented in FIG. 1. In another embodiment, the metal-air electrochemical cell includes two cathodes and one anode. In another embodiment, the metal-air electrochemical cell includes one cathode and one anode.

In one embodiment, "discharge" refers to cell discharge. In one embodiment, cell discharge is the process wherein a metal anode is oxidized electrochemically liberating electrons.

In one embodiment, the ultrasonic source generates ultrasonic energy in the alkaline electrolyte. In one embodiment, a portion of the ultrasonic source (or one element of the ultrasonic source) is located within the electrolyte solution. In one embodiment, a portion of the ultrasonic source surrounds the electrolyte chamber. In one embodiment, the ultrasonic source is operated prior to cell discharge. In one embodiment, the ultrasonic source is operated during cell discharge. In one embodiment, the ultrasonic source is operated following cell discharge. In one embodiment, the ultrasonic source is operated prior to, during and/or following cell discharge. In one embodiment, the operation of the ultrasonic source (i.e. the generation of ultrasound energy by the source) is pulsed. In another embodiment, the operation of the ultrasonic source (i.e. the generation of ultrasound energy by the source) is conducted in a continuous manner. In one embodiment, ultrasonic energy applied to an electrolyte to which nanoparticles were added. In one embodiment, ultrasonic energy is applied to the electrolyte, without addition of submicron or nanoparticles to the electrolyte. In one embodiment, the electrolyte is sonicated during discharge. In one embodiment, the electrolyte is sonicated during portions of the total discharge time. In one embodiment, sonication affects the electrolyte, species in the electrolyte, the nanoparticles, the forming gel species, or a combination thereof.

In one embodiment, a "battery" is synonymous with a "cell". In one embodiment, a "battery" comprises more than one cell. In one embodiment, a battery comprises at least two "cells". In one embodiment, a battery is formed by connecting certain number of single cells in series or in parallel. In one embodiment, capacity and energy values associated with a battery are a function of the number of cells fanning the battery. In one embodiment, capacity and energy values associated with the battery are a function of the configuration of the cells in the battery.

Metal-air cells or batteries are very attractive power sources in light of their potential high energy density. In this type of cells the oxidizing reactant (oxygen) which undergoes reduction during discharge is supplied from outside the cell. This reaction of oxygen reduction occurs in the presence of water and gives hydroxide ions (OH). The oxygen is reduced on the surface of the cathode during discharge. The cathode comprises a material that catalyzes the above-mentioned oxygen reduction. This material is called a 'catalyst'. Such catalysts includes, inter alia, silver, platinum, perovskite-type oxides, mixed metal oxides with spinel structure etc. In one embodiment, the catalyst includes a porous cluster of silver particles; and crystalline particles of $ZrO_2$; wherein the $ZrO_2$ particles reside on the surface of the silver particles. In one embodiment, the average size of the clusters is between 15 and 20 micron. In one embodiment, the zirconium oxide content is about 0.5%.

In one embodiment, the metal-air electrochemical cell of this invention includes an anode and an air-cathode. In one embodiment, the anode is selected from the group consisting of iron, zinc, magnesium, lithium, aluminum, alloys of these metals, and mixtures thereof. In another embodiment, the anode consists of or comprises aluminum. In another embodiment, the anode consists of or comprises of zinc.

In one embodiment, the air-cathode of electrochemical cells of this invention consists of an active mix of a catalyst, current collector and a hydrophobic porous film (such as polytetrafluoroethylene (PTFE)) bonded thereto which can be produced by compacting and sintering. The cathodes could be covered by a hydrophilic porous film thus separating the cathode active side from the electrolyte. The cathode active side is in contact with the electrolyte and this is the side where the reaction of oxygen reduction occurs.

Figure 3:
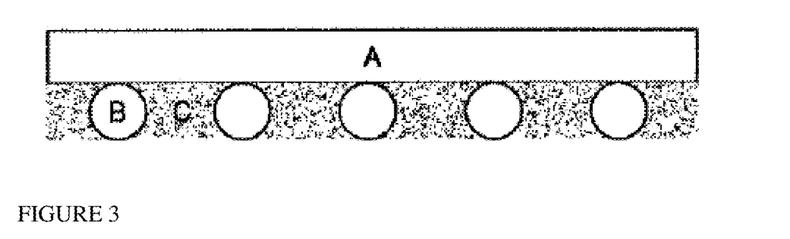
FIG. 3 is a schematic drawing of one embodiment of an air cathode structure; an active catalyst mix C is distributed around and in direct contact with at least one current collector B. Active catalyst mix C and current collector B are together located on one broad face of a hydrophobic layer A.

One embodiment of a cathode of this invention is depicted in FIG. 3, including active mix C, at least one current collector B, and a hydrophobic layer A. A broad face of hydrophobic porous layer A covers both active mix C and current collector B. It is further evident from FIG. 3 that active mix C and current collector B are disposed on a single side of the broad face of hydrophobic layer A. In one embodiment, an "active mix" comprises the catalyst and a polymer. In one embodiment, the polymer is a water-repellant polymer. In one embodiment, the catalyst and the polymer are mixed. In one embodiment, the active mix is described in U.S. Pat. No. 8,142,938 fully incorporated herein by reference.

In one embodiment, the "active mix" comprises a catalyst and a polymer. In practice, and according to one embodiment, the active mix includes a catalyst comprising porous clusters of silver particles; the active mix further comprises a water repellant material (e.g. a water repellant polymer) in powder or fibrous form. In particular, the water repellant polymers include but are not limited to paraffin, and hydrophobic polymers. Such hydrophobic polymers include fluorinated polymers. Such fluorinated polymers include but are not limited to polytetrafluoroethylene, fluorinated ethylene-propylene, perfluoroalkoxy polymer resin chlorotrifluoroethylenes, and polyvinylidene fluorides.

In one embodiment, a "current collector" is a conducting material that is in contact with the catalyst and/or is part of the electrode. The current collector is used to pass current from the cathode (e.g. the Ag catalyst), through the current collector wire to the anode and/or to pass electrons from the anode to the cathode through a load in a discharge mode. During charging, the current collector passes current to the catalyst for charging.

In one embodiment, "active mix" is a mix of the catalyst (e.g. a cluster of silver particles comprising the $ZrO_2$ particles) and a water repellant polymer.

In one embodiment, in the active mix the average size of the catalyst clusters is ranging between 10-15 micron. In one embodiment, in the active mix the average size of the catalyst clusters is ranging between 1-50 micron. In one embodiment, in the active mix the average size of the catalyst clusters is ranging between 20-100 micron. In one embodiment, in the active mix the average size of the catalyst clusters is ranging between 5-25 micron. In one embodiment, in the active mix the average size of the catalyst clusters is ranging between 1-100 micron.

In one embodiment, the catalyst includes porous clusters of silver particles and crystalline particles of $ZrO_2$ wherein the $ZrO_2$ particles reside within the pores and on the surface of the silver particles. In one embodiment, the $ZrO_2$ content in the catalyst ranges between 0.55% and 3.8% by weight. In one embodiment, the $ZrO_2$ content in the catalyst ranges between 0.1% and 6.0% by weight. In one embodiment, the $ZrO_2$ content in the catalyst ranges between 0.01% and 10.0% by weight. In one embodiment, the $ZrO_2$ content in the catalyst ranges between 0.1% and 4.0% by weight. In one embodiment, the $ZrO_2$ content in the catalyst ranges between 0.5% and 0.6% by weight.

In one embodiment, the specific surface area (SSA) of the catalyst is ranging between between 4.5 $m^2$/g and 7.5 $m^2$/g. In one embodiment, the specific surface area (SSA) of the catalyst is ranging between 1.0 $m^2$/g and 10.0 $m^2$/g. The minimum purity of the silver/$ZrO_2$ material is at least 99.7% by weight in one embodiment. The minimum purity of the silver/$ZrO_2$ material is at least 99.0% by weight in another embodiment. The minimum purity of the silver/$ZrO_2$ material is at least 98.0% by weight in another embodiment.

In one embodiment, the ratio (by weight) of silver/$ZrO_2$ catalyst to PTFE powder was 84:16. In one embodiment, the ratio (by weight) of silver/$ZrO_2$ catalyst to PTFE powder is ranging between 90:10 and 80:20. In one embodiment, the ratio (by weight) of silver/$ZrO_2$ catalyst to PTFE powder is ranging between 97:3 and 70:30.

In one embodiment, the "hydrophobic porous film layer" is permeable to gas (e.g. air) but is not permeable to water or to an alkaline solution that is present within the electrochemical cell. In one embodiment, the hydrophobic polymer gas diffusion layer is also referred to as the "porous hydrophobic film". In one embodiment, the hydrophobic polymer film constitutes the backing of the electrode and the 'wall' of the electrochemical cell. In one embodiment, oxygen can enter the cell through the hydrophobic polymer film but electrolyte solution can not exit the cell through this hydrophobic polymeric film.

In one embodiment, the "water repellant polymer" is a polymer used to organize a three-phase zone further comprising the catalyst. In one embodiment, the water repellant polymer forms a three-phase structure such that it supports the agglomerates/cluster of the silver particles. In one embodiment, the catalyst together with the repellant polymer provides a three-phase zone structure for efficient electrochemical reactions. In one embodiment, the water repellant polymer is in the form of particles (powder). In one embodiment, the water repellant polymer is in the form of fibers. In one embodiment, the water repellant polymer is also referred to as the polymer binder.

In one embodiment, the active side of cathodes of the invention (the side that comprises active mix C as shown in FIG. 3) is further covered by a porous hydrophilic layer, separating the active side of the cathode from the electrolyte. The porous hydrophilic layer or separator separates the active side of the cathode from the electrolyte and protects the active layer against blows and damage from the moving submicron particles that are present in the electrolyte. Since this hydrophilic layer is porous, electrolyte is free to flow through it and the electrolyte is available for the electrochemical reaction.

In one embodiment, metal-air electrochemical power sources of the invention and particularly Al-air batteries and fuel cells with alkaline electrolytes of the invention are suitable for use in electric vehicles, in unmanned aerial vehicles (UAV), in reserve and in emergency power supplies and in other applications.

In one embodiment, this invention provides a composition for use in a metal-air electrochemical cell, said composition comprises:
an alkaline aqueous solution; and
submicron particles;
wherein said composition is used as the alkaline electrolyte solution in said cell.

In one embodiment, this invention provides an electrolyte composition for metal-air electrochemical cell, said composition comprises:
an alkaline aqueous solution; and
submicron particles.

In one embodiment, the metal-air electrochemical cell is an Al-air cell. In one embodiment, the metal hydroxide precipitate comprises $Al(OH)_3$. In one embodiment, the alkaline aqueous solution comprises sodium hydroxide or potassium hydroxide. In one embodiment, the concentration of the sodium hydroxide or of said potassium hydroxide is ranging between 20-30 wt % of said alkaline aqueous solution. In one embodiment, the submicron particles comprise $Al_2O_3$, $TiO_2$, $ZrO_2$ or a combination thereof. In one embodiment, the submicron particles comprises between 0.1-1.5 wt % of the total amount of said composition. In one embodiment, the alkaline aqueous solution comprises between 98.5-99.9 wt % of the total amount of said composition.

In one embodiment, the term "a" or "one" or "an" refers to at least one. In one embodiment the phrase "two or more" may be of any denomination, which will suit a particular purpose. In one embodiment, "about" or "approximately" or "roughly" may comprise a deviance from the indicated term of +1%, or in some embodiments, −1%, or in some embodiments, 2.5%, or in some embodiments, ±5%, or in some embodiments, ±7.5%, or in some embodiments, ±10%, or in some embodiments, ±15%, or in some embodiments, ±20%, or in some embodiments, ±25%.

The following examples are presented in order to more fully illustrate the preferred embodiments of the invention. They should in no way be construed, however, as limiting the broad scope of the invention.

EXAMPLES

Example 1

Al-Air Electrochemical Cell

A schematic view of the Al-air electrochemical cell is presented in FIG. 1. The electrochemical cell was an open cell with two cathodes and one anode. The air cathodes [4], consisting of active mix (catalyst and water repellant polymer), current collector and PTFE porous gas-diffusion film as a hydrophobic layer, were produced by compacting and sintering (as described in WO/2008/036962 which is incorporated herein by reference). The cathodes were further covered by a porous hydrophilic layer, separating the active side of the cathode from the electrolyte. The porous hydrophilic layer or separator separates the active side of the cathode from the electrolyte [3] and protects the active layer against blows and damage from the moving submicron particles present in the electrolyte. Since this hydrophilic layer is porous, electrolyte is free to flow through it and is available for the electrochemical reaction. As a catalyst for active mix, silver porous clusters alloyed by zirconium oxide were used. Al anode [2] having a thickness of 3 mm was produced from Al—Mg (97.5-2.5 wt %) alloy using a special heat treatment. The working area of the cathodes and anode was 52.5 cm$^2$. The distance between the cathodes was 7 mm. All the cell's components were contained in a casing [1]. The circulation of electrolyte into (and out of) the cell was carried out through two inlets [5] and two outlets [6] openings. Centrifugal pump NH-5PX-Z-D, produced by Pan World Co., Ltd., Japan, was used for electrolyte circulation. Circulation was carried out throughout the discharge operation. The two areas of the cell separated by anode [2] were not leak-tight separated: some leakage is possible but this does not interfere with and does not damage the process.

Example 2

Electrolyte Utilization Coefficient

Figure 2:
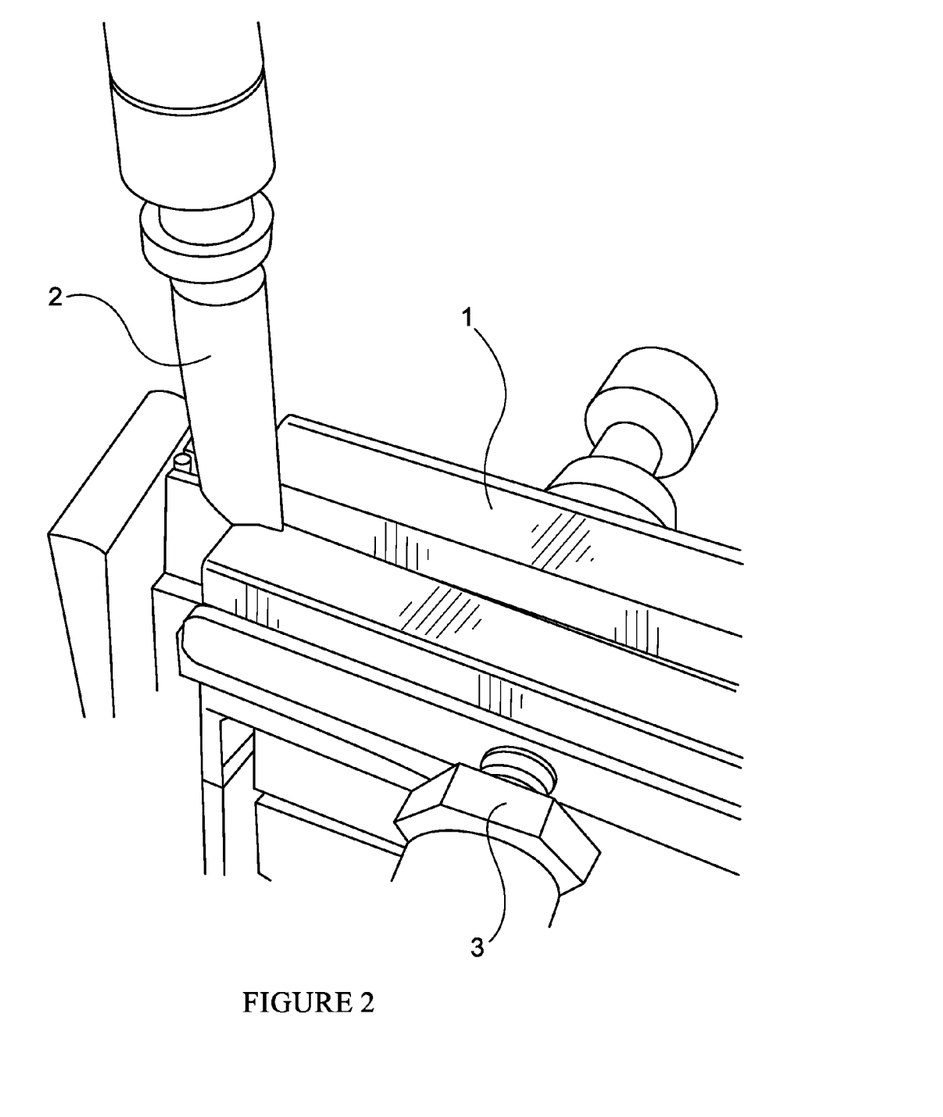
FIG. 2 is a picture of the metal-air electrochemical battery assembly as presented in FIG. 1 including an ultrasonic vibration element which is placed directly into the cell's electrolyte chamber. The cell presented in FIG. 2 includes: an electrochemical case [1]; an upper part of the ultrasonic transducer [2]; and an outlet for the circulating electrolyte [3].

Methods:

The electrolyte utilization coefficient was determined using the Al-air electrochemical cell of this invention as described in Example 1. The total volume of circulating electrolyte (comprising 25% KOH) at the beginning of the test was 200 ml. Nominal current for all the test was 10.5 A (100 mA/cm$^2$), temperature: 40-42° C. Ultrasonic vibration was produced by processor PRO SCALE MAGNET/ULTRASONIC SCALER/ENDO having 30 W power and producing 25 kHz frequency. The processor's probe tip having 1.2 mm diameter was placed directly into the cell's electrolyte chamber. (FIG. 2). The starting voltage of the tests was 1.27-1.3V. The low shut-off voltage was fixed at 0.8V. The electrolyte utilization coefficient for each test was determined as a ratio of the total amount of Ampere-hours to 200 ml.

Results:

For each test the coulombic efficiency of the anodes was measured. This value was calculated by dividing the total capacity (Ah) by weight loss (g) and 2.98 Ah/g (2.98 Ah/g is the Electrochemical Equivalent of aluminum). This value for all the tests (tests for different anodes) was in accuracy of 95±1%. TiO$_2$ nano-particle powder (Degussa, P-25) having 25 nm average particle size in an amount of 0.4 wt % to the total amount of electrolyte was used.

The electrolyte utilization coefficient at different conditions are summarized in the following table 1:

TABLE 1

Electrolyte utilization coefficient at different conditions:

| Test parameter | Electrolyte utilization coefficient, Ah/ml |
|---|---|
| Pure 25% KOH | 0.29 |
| 25% KOH + TiO$_2$ nano-particles | 0.36 |
| 25% KOH + sonication | 0.42 |
| 25% KOH + TiO$_2$ nano particles + sonication | 0.48-0.5 |

Accordingly, addition of nano-size particles increased the electrolyte utilization coefficient. Addition of nano-size particles together with applying ultrasonic vibration increased the electrolyte utilization coefficient even further.

Example 3

Preparation of Silver Catalyst for the Air-Cathode

The silver catalyst included porous clusters of silver particles; and crystalline particles of ZrO$_2$; wherein the ZrO$_2$ particles reside on the surface of the silver particles. The silver catalyst was prepared as follows:

A sample of 100 g of the silver powder produced from heat treated strips 25 Ag-7 Al alloy (weight percent) and having a primary particle size about 40-50 nanometers, was taken as a precursor material. The specific surface area (SSA) of this powder as measured by the B.E.T. method was 6.7 m$^2$/g. In one embodiment, 10 g of zirconium (IV) dinitrate oxide hydrate was dissolved in 140 ml or in 200 ml of water. In one embodiment, 1 g of zirconium (IV) dinitrate oxide hydrate was dissolved in 140 ml or in 200 ml of water. Silver powder was immersed in this solution and soaked for 1 hour. Afterwards, 30 ml of 25% NaOH was poured into the suspension under intensive stirring, which lasted for a few minutes or up to one hour until the reaction (precipitation of white flakes) was finished. The mix was rinsed to a neutral pH of about 7 to remove the NaOH solution, decanted and dried out.

The heat treatment was carried out according to the following mode: 250° C. for 20-60 minutes for dehydration, followed by 450° C. for 15 minutes to produce zirconium oxide crystals. The final ZrO$_2$ content in the catalyst ranged between 0.55% and 3.8% by weight, and the specific surface area (SSA) of the catalyst was between 4.5 m$^2$/g and 7.5 m$^2$/g. The minimum purity of the silver/ZrO$_2$ material was at least 99.7% by weight.

Example 4

Preparation of an Air-Cathode

The air cathode, consisting of active mix, PTFE porous gas-diffusion film as a hydrophobic layer and a current collector was produced by compacting and sintering as follows: as a catalyst for the active mix, the silver porous clusters alloyed by zirconium oxide as described in example 3 were used. The average size of the clusters was 10-15 micron; the ZrO$_2$ content was 0.55 wt %. Specific surface area of the catalyst was 4.5 m$^2$/g.

As a polymer binder, PTFE powder of grade Zonyl MP 1200 produced by DuPont (average particle size of 3 micron) was used. The ratio (by weight) of silver/$ZrO_2$ catalyst to PTFE powder was 84:16.

Woven nickel grid of 20 mesh size having wire diameter of 0.16 mm was used as a current collector and supporting member of the electrode. Before compacting the grid was coining (flattening) under the pressure of 250-300 kg/cm$^2$.

The active mix was produced by manual mixing of the catalyst and the PTFE powder for 10-15 min followed by double manual sieving through a 75 micron sieve. The active mix loading was 90 mg/cm$^2$.

Double layer of PTFE gas diffusion membrane B-type, produced by W.L. Gore & Associates, Inc. was used as a hydrophobic gas diffusion layer. The electrode of 85×85 mm was compacted under 120 kg/cm$^2$ and sintered in air at 343° C. for 15 min.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A metal-air cell comprising:
   an electrolyte chamber comprising circulating alkaline electrolyte, wherein said alkaline electrolyte comprises submicron particles;
   an inlet for introducing said electrolyte into said electrolyte chamber;
   an outlet for removing said electrolyte from said electrolyte chamber; and
   optionally an ultrasonic source;
   wherein ultrasonic vibration is optionally applied to said electrolyte; and
   wherein said submicron particles, said ultrasonic vibration or a combination thereof avoid the formation of or remove or reduce the size of or reduce the concentration of metal-hydroxide precipitate formed in said alkaline electrolyte solution of said metal-air electrochemical cell during an electrochemical reaction and wherein said submicron particles are not seed particles, and wherein said submicron particles comprise $Al_2O_3$, $TiO_2$, $ZrO_2$ or a combination thereof and wherein the average diameter of said submicron particles is between 5 nm to 1000 nm.

2. The metal-air cell of claim 1, wherein said metal-air cell is an Al-air cell.

3. The metal-air cell of claim 1, wherein said alkaline electrolyte comprises sodium hydroxide or potassium hydroxide.

4. The metal-air cell of claim 1, wherein said particles are added in an amount of between 0.1-1.5 wt % from the total amount of said electrolyte used.

5. The metal-air cell of claim 1, wherein said ultrasonic source generates ultrasonic energy in said alkaline electrolyte.

6. The metal-air cell of claim 1, wherein a portion of said ultrasonic source is located within said electrolyte chamber, or surrounds said electrolyte chamber or a combination thereof.

7. A metal-air cell comprising:
   an electrolyte chamber comprising circulating alkaline electrolyte, wherein said alkaline electrolyte comprises submicron particles;
   an inlet for introducing said electrolyte into said electrolyte chamber;
   an outlet for removing said electrolyte from said electrolyte chamber; and
   optionally an ultrasonic source;
   wherein ultrasonic vibration is optionally applied to said electrolyte; and wherein said submicron particles, said ultrasonic vibration or a combination thereof avoid the formation of or remove or reduce the size of or reduce the concentration of metal-hydroxide precipitate formed in said alkaline electrolyte solution of said metal-air electrochemical cell during an electrochemical reaction and wherein said submicron particles are not seed particles, and wherein said submicron particles comprise $Al_2O_3$, $TiO_2$, $ZrO_2$ or a combination thereof and, wherein the average diameter of said submicron particles is between 1 nm to 100 nm.

8. The metal-air cell of claim 1, wherein the D50 for said submicron particles is in a range between 10 nm to 100 nm.

9. The metal-air cell of claim 1, said submicron particles are added to said electrolyte prior to battery discharge.

10. The metal-air cell of claim 1, wherein said submicron particles are added to said electrolyte during battery discharge.

11. The metal-air cell of claim 1, wherein said cell comprises one cathode and one anode.

12. The metal-air cell of claim 1, wherein said cell comprises two cathodes and one anode.

13. The metal-air cell of claim 1, wherein said cell is used in electric vehicles, in unmanned aerial vehicles (UAV), in reserve and in emergency power supplies.

14. A method of avoiding the formation of or of removing or of reducing the concentration of metal-hydroxide precipitate formed in an alkaline electrolyte solution of a metal-air electrochemical cell according to claim 1 during an electrochemical reaction, said method comprising adding submicron particles to said solution or applying ultrasonic vibration to said solution or a combination thereof.

15. The method of claim 14, wherein said metal-air electrochemical cell is an Al-air cell.

16. The method of claim 15, wherein said metal hydroxide precipitate comprises $Al(OH)_3$.

17. The method of claim 14, wherein said alkaline electrolyte solution comprises sodium hydroxide or potassium hydroxide.

18. The method of claim 14, wherein said electrolyte solution is subjected to circulation.

19. The method of claim 14, wherein said submicron particles comprises $Al_2O_3$, $TiO_2$, $ZrO_2$ or a combination thereof.

20. The method of claim 14, wherein said particles are added in an amount of between 0.1-1.5 wt % from the total amount of said electrolyte used.

21. A method of increasing the electrolyte utilization coefficient of an alkaline electrolyte in a metal-air electrochemical cell according to claim 1, comprising adding submicron particles to said electrolyte or applying ultrasonic vibration to said electrolyte or a combination thereof.

22. The method of claim 21, wherein said metal-air cell is an Al-air cell.

23. The method of claim 22, wherein said increasing the utilization coefficient of said electrolyte is achieved by reducing the concentration of $Al(OH)_3$ precipitate in said electrolyte.

24. The method of claim 21, wherein said alkaline electrolyte comprises sodium hydroxide or potassium hydroxide.

25. The method of claim 21, wherein said electrolyte is subjected to circulation.

26. The method of claim 21, wherein said submicron particles comprises $Al_2O_3$, $TiO_2$, $ZrO_2$ or combination thereof.

27. The method of claim 21, wherein said particles are added in an amount of between 0.4-0.6 wt % from the total amount of said electrolyte used.

28. The method of claim 21, wherein said method increases the electrolyte utilization coefficient up to a value ranging between 0.6 and 0.7Ah/ml.

* * * * *